(12) United States Patent
Watson et al.

(10) Patent No.: US 7,356,506 B2
(45) Date of Patent: Apr. 8, 2008

(54) METHODS AND APPARATUS FOR EVALUATING A CREDIT APPLICATION

(75) Inventors: Tamara C. Watson, West Chester, OH (US); Scott G. Andreozzi, New Fairfield, CT (US); Daniel M. Borchers, Dayton, OH (US); Janine Movish, Liberty Township, OH (US); Jonathan Christian Smith, Washington Township, OH (US); Dinesh Narain, New Delhi (IN)

(73) Assignee: General Electric Capital Corporation, Stamford, CT (US)

( * ) Notice: Subject to any disclaimer, the term of this patent is extended or adjusted under 35 U.S.C. 154(b) by 564 days.

(21) Appl. No.: 10/246,102

(22) Filed: Sep. 18, 2002

(65) Prior Publication Data
US 2004/0054619 A1    Mar. 18, 2004

(51) Int. Cl.
*G06Q 40/00*    (2006.01)
(52) U.S. Cl. ....................................................... 705/39
(58) Field of Classification Search ............. 705/39–41
See application file for complete search history.

(56) References Cited

U.S. PATENT DOCUMENTS

| | | | |
|---|---|---|---|
| 5,262,941 A | 11/1993 | Saladin et al. | |
| 5,696,907 A | 12/1997 | Tom | |
| 5,774,882 A | 6/1998 | Keen et al. | |
| 5,878,403 A * | 3/1999 | DeFrancesco et al. | 705/38 |
| 6,029,154 A | 2/2000 | Pettitt | |
| 6,088,686 A * | 7/2000 | Walker et al. | 705/38 |
| 6,095,413 A | 8/2000 | Tetro et al. | |
| 6,112,190 A * | 8/2000 | Fletcher et al. | 705/38 |
| 6,631,361 B1 * | 10/2003 | O'Flaherty et al. | 706/47 |
| 2002/0091635 A1 * | 7/2002 | Dilip et al. | 705/39 |

OTHER PUBLICATIONS

Phillips Business Infromation, Inc. "credit applications being reviewed at front and bach end for fraud detection", credit risk management report, v1, n6, pN/A, Mar. 18, 1991.*

"University of California, San Diego: Identity Theft", download from http://sls.ucsd.edu/Newsletter/Identity%20Theft.htm on Mar. 12, 2002. 3pgs.

Muller, Nathan J., "True Identity Fraud", download from http://www.networkusa.org/fingerprint/page3/fp-technology-nmuller.html on Mar. 12, 2002. 5pgs.

"Frequently Asked Questions", download from http://www.identitytheft.org/faq.htm on Mar. 12, 2002. 4pgs.

"RiskWise"—Documentation—download from http://www.riskwise.com/default.html on Mar. 21, 2002. 11pgs.

"Experian"—Documentation—download from http://www.experian.com/consumer/index.html on Mar. 21, 2002. 7pgs.

* cited by examiner

*Primary Examiner*—Hani M. Kazimi
(74) *Attorney, Agent, or Firm*—Buckley, Maschoff & Talwalkar LLC

(57) ABSTRACT

In a method and apparatus for facilitating review of a credit application for true name fraud, an applicant might provide or submit an application for credit. One or more rules may govern when information regarding an application or its associated applicant is obtained, used, displayed as part of the application evaluation process and whether or not the application should be approved or denied.

16 Claims, 9 Drawing Sheets

APPLICATION INFORMATION

CLIENT: BIGCOM HOME STORE
STORE ID. 234154
APPLICATION DATE: 05/01/02
NAME: SUSAN JOHNSON
RESIDENCE ADDRESS 1: 111 MAIN STREET
RESIDENCE ADDRESS 2: APARTMENT 41C
CITY: NEWTOWN
STATE: CT
ZIPCODE. 55555
YEARS AT RESIDENCE: 1.5
RESIDENCE TELEPHONE: 555-555-5555
DATE OF BIRTH: 03/18/67
SSN. 555-55-5555
EMPLOYER. ACME COMPANY
INCOME: $45,000 YEAR
DRIVER'S LICENSE NUMBER: 5555555555
DRIVER'S LICENSE STATE: CT
REASON CODE: R32
VIA: INSTORE
CREDIT LIMIT: $500
GENDER: F

INFORMATION SOURCE 1 INFORMATION

DATE: 05/02/03
TIME: 09:22.20 AM
INFORMATION PROVIDED FOR: SOCIAL SECURITY
NUMBER 555-55-5555

| | |
|---|---|
| NAME: | SUSAN JOHNSON |
| ADDRESS 1: | 111 MAIN STREET |
| ADDRESS 2: | APARTMENT 41C |
| CITY. | NEWTOWN |
| STATE: | CT |
| ZIP: | 55555 |
| SSN: | 555-55-5555 |
| HOME TEL: | 555-555-5555 |
| GENDER: | F |
| DATE OF BIRTH: | |

| CB 1 520 | CB 2 522 | CB 3 524 | AUD 526 | SCR 528 | IS 1 530 | IS 2 532 |
|---|---|---|---|---|---|---|

| FIELD | APPLICATION | REPORTED |
|---|---|---|
| NAME | SUSAN JOHNSON | |
| RES ADD1 | 111 MAIN STREET | |
| RES. ADD2 | APARTMENT 41C | |
| CITY | NEWTOWN | |
| STATE | CT | |
| ZIP CODE | 55555 | |
| YAR | 1 5 | |
| RES. TEL. | 555-555-5555 | |
| DOB: | 03/18/67 | |
| SSN | 555-55-5555 | |
| EMPLOYER | ACME COMPANY | |
| INCOME | $45,000 YEAR | |
| DL NUMBER | 5555555555 | |
| DL STATE | CT | |

[ DECLINE ]   DECLINE CODE [  ]   [ HOLD ]
[ APPROVE ]   FRAUD SCORE [ 50 ]

CREDIT BUREAU 1 INFORMATION

DATE: 05/01/02    TIME: 03.25:40 PM
SOCIAL SECURITY NUMBER: 555-55-5555
FIRST NAME: SUSAN       LAST NAME: JOHNSON

CURRENT ADDRESS:       111 MAIN STREET, APT. 41C
                       NEWTOWN, CT 55555

PREVIOUS ADDRESS       5 ELM STREET
                       NEWTOWN, CT 55555

PREVIOUS ADDRESS       145 DOWNY STREET
                       OLDVILLE, CT 66666

ABCD BANK       ACCT NO. 5566556655665566
BALANCE: $5230
ACCOUNT TYPE: R, CC, JA
CREDIT LIMIT: $1000
PAST DUE: 0

NO SPECIAL MESSAGES ON FILE

FIG. 7

| APPLICATION INFORMATION | INFORMATION SOURCE 1 INFORMATION |
|---|---|
| CLIENT: BIGCOM HOME STORE<br>STORE ID: 234155<br>APPLICATION DATE: 05/01/02<br>NAME: WILLIAM BLAKE<br>RESIDENCE ADDRESS 1: <u>222 CHERRY STREET</u><br>RESIDENCE ADDRESS 2:<br>CITY: NEWTOWN<br>STATE: CT<br>ZIPCODE: 77777<br>YEARS AT RESIDENCE: 0.5<br>RESIDENCE TELEPHONE: <u>777-777-7777</u><br>DATE OF BIRTH: 07/06/63<br>SSN: 123-45-6789<br>EMPLOYER: EXPRESS, INC<br>INCOME: $58,000 YEAR<br>DRIVER'S LICENSE NUMBER:<br>RIVER'S LICENSE STATE:<br>REASON CODE: R32<br>VIA: ON-LINE<br>CREDIT LIMIT: $1000<br>GENDER: M | DATE: 05/02/03<br>TIME: 09:22:20 AM<br>INFORMATION PROVIDED FOR: SOCIAL SECURITY NUMBER 777-77-7777<br><br>ADDRESS 1: <u>224 CHERRY AVENUE</u><br>CITY: NEWTOWN<br>STATE: CT<br>ZIP: 77777<br>SSN: 777-77-7777<br>HOME TEL: <u>777-777-7778</u><br>GENDER: M<br>DATE OF BIRTH: |

| CB 1 520 | CB 2 522 | CB 3 524 | AUD 526 | SCR 528 | IS 1 530 | IS 2 532 |
|---|---|---|---|---|---|---|

| FIELD | APPLICATION | REPORTED |
|---|---|---|
| NAME | WILLIAM BLAKE | |
| RES. ADD1 | 222 CHERRY STREET | MISMATCH |
| RES. ADD2 | | |
| CITY | NEWTOWN | |
| STATE | CT | |
| ZIP CODE | 77777 | |
| YAR | 0.5 | |
| RES. TEL. | 777-777-7777 | MISMATCH |
| DOB: | 07/06/63 | |
| SSN | 123-45-6789 | |
| EMPLOYER | EXPRESS, INC. | |
| INCOME | $58,000 YEAR | |
| DL NUMBER | | |
| DL STATE | | |

DECLINE | DECLINE CODE [ ] | HOLD
APPROVE | FRAUD SCORE [30] |

CREDIT BUREAU 1 INFORMATION

DATE: 05/01/02    TIME: 04:15:40 PM
SOCIAL SECURITY NUMBER: 123-45-6789
FIRST NAME: WILLIAM    LAST NAME: BLAKE

NO RECORD

FIG. 8

| APPLICANT IDENTIFIER 602 | NAME 604 | ADDRESS 605 | SOCIAL SECURITY NUMBER 606 | TELEPHONE NUMBER 608 |
|---|---|---|---|---|
| A-14582 | BILL JONES | UNKNOWN | 333-33-3333 | UNKNOWN |
| A-20575 | SALLY ANDREWS | 505 ELM STREET DENVER, CO 50505 | 123-45-6789 | 555-555-5555 |
| A-37645 | JAMES KITTLE | UNKNOWN | UNKNOWN | UNKNOWN |
| A-44901 | ROBERT SMITH | UNKNOWN | UNKNOWN | 234-234-2345 |
| A-58304 | LUCY JOHNSON | 44 MAIN STREET STAMFORD, CT 40404 | UNKNOWN | UNKNOWN |
| A-69014 | PATRICK WILLIAMS | 111 MAPLE WAY CHESTER, ND 10101 | 444-44-4444 | 111-111-1111 |

FIG. 9

METHODS AND APPARATUS FOR EVALUATING A CREDIT APPLICATION

FIELD OF THE INVENTION

The present invention relates to a method and apparatus for processing an application for credit and, more particularly, embodiments of the present invention relate to methods, means, apparatus, and computer program code for processing and evaluating a credit application for true name fraud.

BACKGROUND OF THE INVENTION

True name fraud and identify theft are growing problems for the credit industry. In many cases, true name fraud and identify theft involve the taking of a victim's identity to obtain credit of bank or retailer issued credit cards. With knowledge of a victim's name, address, and/or other information, an impersonator of the victim can apply for credit and credit cards in the victim's name. Often, the impersonator submits applications for such credit by mail, on-line, or at a retailer posing as the victim. The impersonator may provide an address or other information known about the victim as part of the application. In some cases, the impersonator may provide a new address, telephone number, etc. claiming to have recently moved. For applications provided by mail or on-line, the impersonator may provide false information or stolen identity information for social security number, address, etc.

As banks, retailers, and other credit providers or credit card issuers often wish to issue credit when possible, they may allow credit even if they are not completely sure the applicant is who he or she states to be. Furthermore, in some situations a processor of the application may have a limited amount of time to review the application. For example, a potential customer may apply for instant credit on-line or while at a retailer. If processing the credit application takes too long, the customer (even if the customer is not committing true name fraud) may terminate the application process. Thus, the customer or the retailer may require that the application be reviewed in a short or designated amount of time, thereby placing great pressure on the application review process. While banks, retailers and other credit providers or credit card issuers do not want to approve applications that indicate a potential true name fraud situation, the banks, retailers and other credit providers or credit card issuers also do not want to deny credit to a person providing a valid application or is, in fact, who he or she claims to be.

It would be advantageous to provide a method and apparatus that overcame the drawbacks of the prior art. In particular, it would be desirable to provide methods, means, apparatus, and computer program code for determining true name fraud while processing a credit application. In addition, it would be desirable to provide methods, means, apparatus, and computer program code that allowed information useful in processing an application to be obtained and used efficiently.

SUMMARY OF THE INVENTION

Embodiments of the present invention provide a system, method, apparatus, means, and computer program code for reviewing and processing applications, particularly for evaluating applications for true name fraud. An applicant might provide or submit an application for credit in a variety of circumstances or ways (e.g., online, while at a merchant). One or more rules may govern when information regarding an application or its associated applicant is obtained, used, displayed as part of the application evaluation process and whether or not the application should be approved or denied. Rules may be based on different factors, including, but not limited to, the communication channel used by an applicant to submit an application, the type of merchant for which the applicant is requesting credit, the requirements or fraud risk criteria designated by the merchant, etc. One or more rules may govern when and where information regarding an application can be obtained and/or whether or not an application should be approved or declined as a result of information obtained. The rules may improve the application evaluation process by reducing or even eliminating costs incurred unnecessarily, by improving the consistency of the application review process, and by streamlining the presentation of information to a person involved in evaluating an application.

Additional objects, advantages, and novel features of the invention shall be set forth in part in the description that follows, and in part will become apparent to those skilled in the art upon examination of the following or may be learned by the practice of the invention.

According to some embodiments of the present invention, a method for facilitating evaluation of a credit application for fraud may include establishing a first plurality of rules governing when different portions of information may be obtained for use in evaluating an application for fraud; establishing a second plurality of rules governing how an application is to be evaluated in view of information obtained in accordance with the first plurality of rules; receiving data indicative of a first application requiring an evaluation for fraud; obtaining information associated with the first application in accordance with the first plurality of rules; and evaluating the first application in accordance with the second plurality of rules. In some other embodiments, a method for facilitating evaluation of a credit application for fraud may include receiving data indicative of an application requiring an evaluation for fraud; determining at least one rule regarding obtaining of information associated with the application; determining at least one rule regarding evaluation of the application based on the information associated with the application; obtaining information regarding the application in accordance with the at least one rule regarding obtaining of information associated with the application; and making a determination regarding approval of the application in accordance with the at least one rule regarding evaluation of the application. In some further embodiments, a method for facilitating evaluation of a credit application for fraud may include receiving data indicative of an application requiring an evaluation for fraud; determining at least one rule regarding obtaining of information associated with the application and evaluation of the application using the information; obtaining information regarding the application in accordance with the at least one rule; and making a determination regarding approval of the application in accordance with the at least one rule. In some still further embodiments, a method for facilitating evaluation of a credit application for fraud may include establishing at least one rule regarding obtaining of information associated with the application and evaluation of the application using the information; receiving data indicative of a first application requiring an evaluation for fraud; retrieving information associated with the first application in accordance with the at least one rule; and evaluating the first application in accordance with the second plurality of rules. In some additional embodiments, a method for processing an application for credit may include establishing at least one process rule for obtaining information regarding an applicant for credit; establishing at least one business rule associated with a determination regarding true name fraud for the applicant for credit; receiving data indicative of an application requiring a true name fraud determination; determining information in accordance with the at least one process rule, wherein the information regards an applicant associated with the application; making a determination regarding approval of the application in accordance with the at least one business rule; and providing data indicative of the determination.

According to some embodiments of the present invention, a system for processing an application for credit may include a first device, wherein the first device receives a plurality of applications for credit and selects at least one of the plurality of applications for review for true name fraud; and a second device in communication with the first device, wherein the second device processes the at least one of the plurality of applications for review for true name fraud in accordance with at least one rule governing evaluation of an application.

According to some embodiments of the present invention, a system for facilitating evaluation of an application for credit may include a memory; a communication port; and a processor connected to the memory and the communication port, the processor being operative to receive data indicative of an application requiring an evaluation for fraud; determine at least one rule regarding obtaining of information associated with the application and evaluation of the application using the information; obtain information regarding the application in accordance with the at least one rule; and make a determination regarding approval of the application in accordance with the at least one rule. Other or similar systems may implement one or more of the methods described above.

According to some embodiments of the present invention, a computer program in a computer readable medium for facilitating evaluation of an application for credit may include first instructions for obtaining data indicative of an application requiring an evaluation for fraud; second instructions for identifying at least one rule regarding obtaining of information associated with the application and evaluation of the application using the information; third instructions for obtaining information regarding the application in accordance with the at least one rule; and fourth instructions evaluating the application in accordance with the at least one rule. In some embodiments, other software programs implement some or all of the methods described above. In some further embodiments, a computer program product in a computer readable medium for facilitating evaluation of an application for credit may include first instructions for displaying information regarding an application being evaluating for fraud; and second instructions for facilitating retrieval of information regarding the application, wherein the retrieval of information is governed by at least one rule. In some additional embodiments, a computer program product in a computer readable medium for facilitating evaluation of an application for credit may include first instructions for implementing an interface, wherein the interface is operative to obtain information regarding an application from at least one source in accordance with at least one rule, display at least a least a portion of the information, and implement at least one rule for evaluation of the application.

According to some embodiments of the present invention, an apparatus for facilitating evaluation of an application for credit may include means for obtaining data indicative of an application requiring an evaluation for fraud; means for identifying at least one rule regarding obtaining of information associated with the application and evaluation of the application using the information; means for obtaining information regarding the application in accordance with the at least one rule; and means for evaluating the application in accordance with the at least one rule. In some other embodiments, other means may be used to implement one or more of the steps or methods described above.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 7 is a representative illustration of an interface that may be used with the true name processor of FIG. 6;

FIG. 8 is another representative illustration of an interface that may be used with the true name processor of FIG. 6; and FIG. 9 is an illustration of a representative applicant information database of FIG. 6.

DETAILED DESCRIPTION

Applicants have recognized that there is a need for systems, means, computer program code, and methods that facilitate review and processing of a credit application, particularly processing of an application for true name fraud. In addition, applicants have recognized that there is a need to facilitate application processing and true name fraud detection in a time, labor and cost effective manner. In an evaluation of an application for true name fraud, a balance must be struck between the need for timely (e.g., speedy) approval of valid applications and the need for evaluate applications thoroughly so that fraudulent applications can be detected and declined.

An applicant might provide or submit an application for credit in a variety of circumstances. For example, a person might submit a credit card application via the U.S. mail or via a Web site. As another example, a person visiting a merchant may want to fill out and submit an application for a merchant branded credit card or some other store credit product while the applicant is at the store. The person may be prompted or asked to submit such a credit application as part of a promotional or marketing campaign conducted by the merchant. Of course, people may submit fraudulent or misleading credit applications that should be rejected or declined.

One technical effect of the systems, means, computer code, and methods of the present invention is that they facilitate the queuing, evaluation and processing of credit applications for true name fraud and allow one or more rules to be used to govern when and how information regarding an application or its associated applicant is obtained, used and/or displayed as part of the application evaluation process.

In some embodiments, rules may be based on different factors, including, but not limited to, the communication channel used by an applicant to submit an application, the type of merchant for which the applicant is requesting credit, the requirements or risk designated by the merchant, etc. These and other features will be discussed in further detail below, by describing a system, individual devices, and processes according to embodiments of the invention.

System

Figure 1:
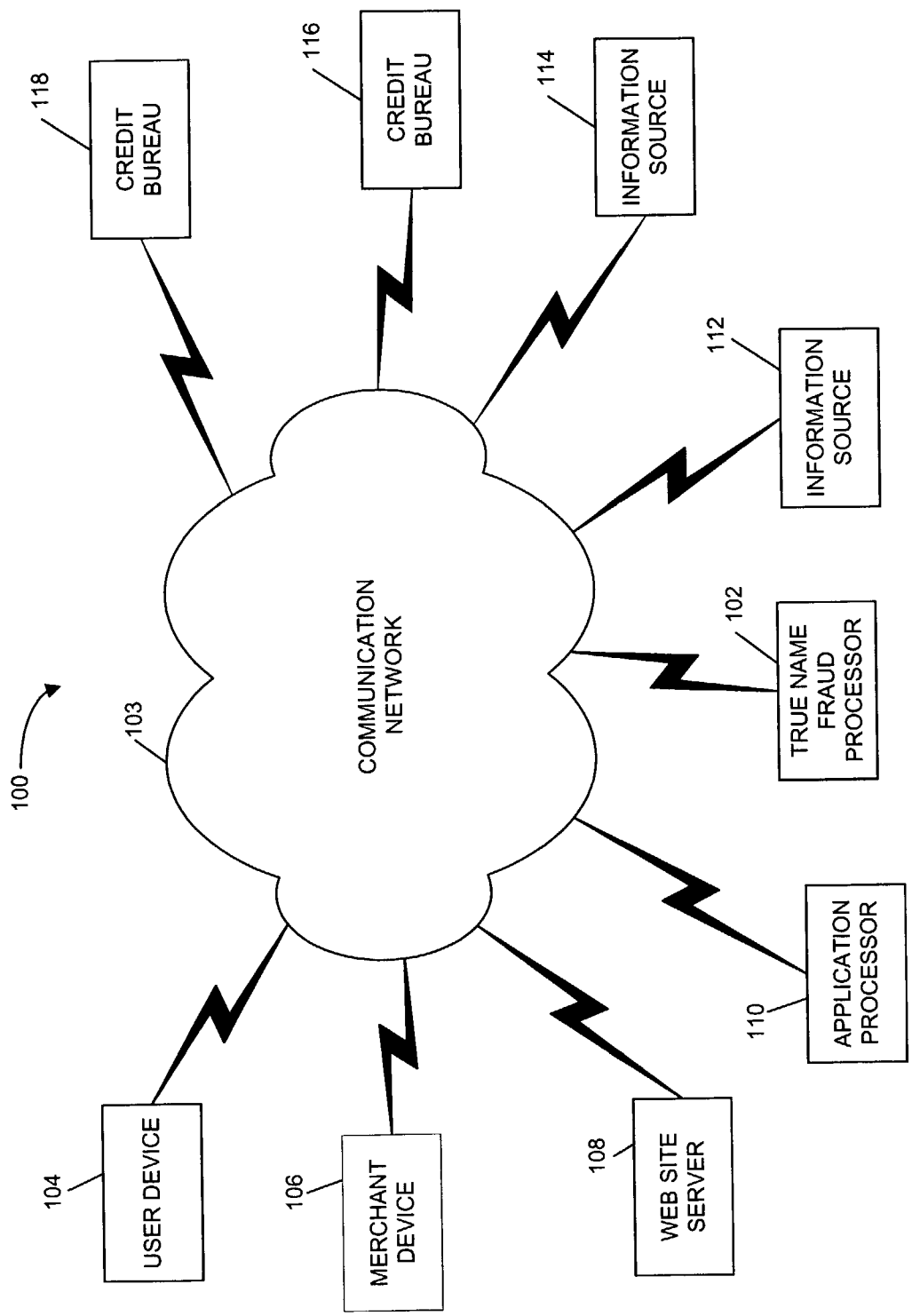
FIG. 1 is a block diagram of a system of components usable with the methods disclosed herein.

Now referring to FIG. 1, a representative apparatus or system 100 usable with the methods disclosed herein is illustrated. The system 100 may include a true name fraud processor, server, system or other device 102 in communication via a computer, data or other communications network 103 with one or more user or client or user devices 104, merchant devices 106, one or more World Wide Web ("Web") servers 108, a credit application processor or system 110, one or more information sources 112, 114, one or more credit bureaus 116, 118 (which can be considered as information sources), and/or or other devices or entities (e.g., database services, file servers, government agencies, retailers).

Many different types of implementations or hardware configurations can be used in the system 100 and with the methods disclosed herein and the methods disclosed herein are not limited to any specific hardware configuration for the system 100 or any of its components. The devices shown in FIG. 1 need not be in constant communication. For example, a user device may communicate with the application processor 110 only when such communication is appropriate or necessary. Similarly, the application processor 110 may communicate with the true name fraud processor 102 only when such communication is appropriate or necessary.

The term "true name fraud processor" is used herein solely for purposes of explanation and convenience and is not used to imply or require any specific attributes, functionality, hardware or software configuration or capabilities, or any other limitations. The true name fraud processor 102 can comprise a single device or computer, a networked set or group of devices or computers, a workstation, etc. The use, configuration and operation of the true name processor 102 will be discussed in more detail below. In some embodiments, the true name processor 102 may be included in, or be part of, another device (e.g., the application processor 110) or may stand alone as a separate device.

In some embodiments, the true name fraud processor 102 may receive applications for credit (e.g., an application for a credit card) directly from an applicant via a user device 104, via a retailer on behalf of an applicant via a merchant device 106, and/or from an applicant or retailer via a Web site hosted by the Web site server 108. For example, an applicant may submit an application on-line, via email, at a merchant, via the post office, etc. In some embodiments, some or all of such applications may be provided directly to the true name fraud process 102 for evaluation and review. In other embodiments, some or all of such applications may be provided to the application processor 110.

In some embodiments, the application processor 110 may receive applications for credit from a variety of sources. For example, applications may be received from or submitted by applicants via user devices 104, from merchants via merchant devices 106, and/or from Web servers 108. In some embodiments, the application processor 110 may prioritize, select and/or queue applications for evaluation by the true name fraud processor 102. For example, applications provided for instant credit or by an applicant in a store may be prioritized higher than credit applications provided by mail.

In some embodiments, the application processor 110 may conduct an initial screening of credit applications and select or identify some of the applications for further review by the true name fraud processor 102. For example, the application processor 110 may provide or act as a first screen or filter of applications, only some of which may be provided to the true name fraud processor 102 for evaluation. For example, the application processor 110 may do an internal scoring of applications. Applications having scores below a designated threshold may automatically be sent by the application processor 110 to the true name fraud processor 102 for further evaluation. The scoring performed by the application processor 110 may look at information provided in the application itself. Such information may include, but is not limited to, the applicant's age, address, sex, stated annual income, gender, length of time at current residence address, occupation, residence, length of time at current employer, etc.; the distance between stated residence of applicant and location (e.g., a retailer) where the application is being made; the credit amount sought (e.g., higher credit amounts will be associated with risk scores indicating a low risk of credit losses); etc. In some embodiments, the application processor 110 may obtain, download, or retrieve information from one or more information sources, such as the information sources 112, 114 and/or the credit bureaus 116, 118, for use in the preliminary evaluation or screening of applications.

An information source, such as the information sources 112, 114 and the credit bureaus 116, 118, may be any type of database, device, Web site, log or entity from which information regarding applicants for credit may be obtained, downloaded, retrieved, received, etc. For example, a credit bureau may be Equifax Information Services, Experion, and TransUnion LLC. Information from the information sources may be used by the application processor 110 and/or the true name fraud processor 102 to evaluate credit applications.

The user or client devices 104 preferably allow applicants to provide credit applications to the application processor 110 and/or the true name fraud processor 102. In addition, the user or client devices 104 may allow applicants to conduct other actions, access other devices or resources connected with the communication network 103. Possible user devices include a personal computer, portable computer, mobile or fixed user station, workstation, network terminal or server, cellular telephone, kiosk, dumb terminal, personal digital assistant, etc. In some embodiments, information regarding one or more user devices may be stored in, or accessed from, a user device information database. In some embodiments, applicants may own or carry their own user devices or may utilize user devices provided by or in a merchant.

In some embodiments, the communications network 103 might be or include the Internet, the World Wide Web, or some other public or private computer, cable, telephone, client/server, peer-to-peer, or communications network or intranet, as will be described in further detail below. The communications network 103 is meant only to be generally representative of cable, computer, telephone, peer-to-peer or other communication networks for purposes of elaboration and explanation of the present invention and other devices, networks, etc. may be connected to the communications network 103 without departing from the scope of the present invention. The communications network 103 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to the application processor 110 and/or the true name fraud processor 102 without departing from the scope of the present invention. Moreover, as used herein, communications include those enabled by wired or wireless technology.

Process Description

Figure 2:
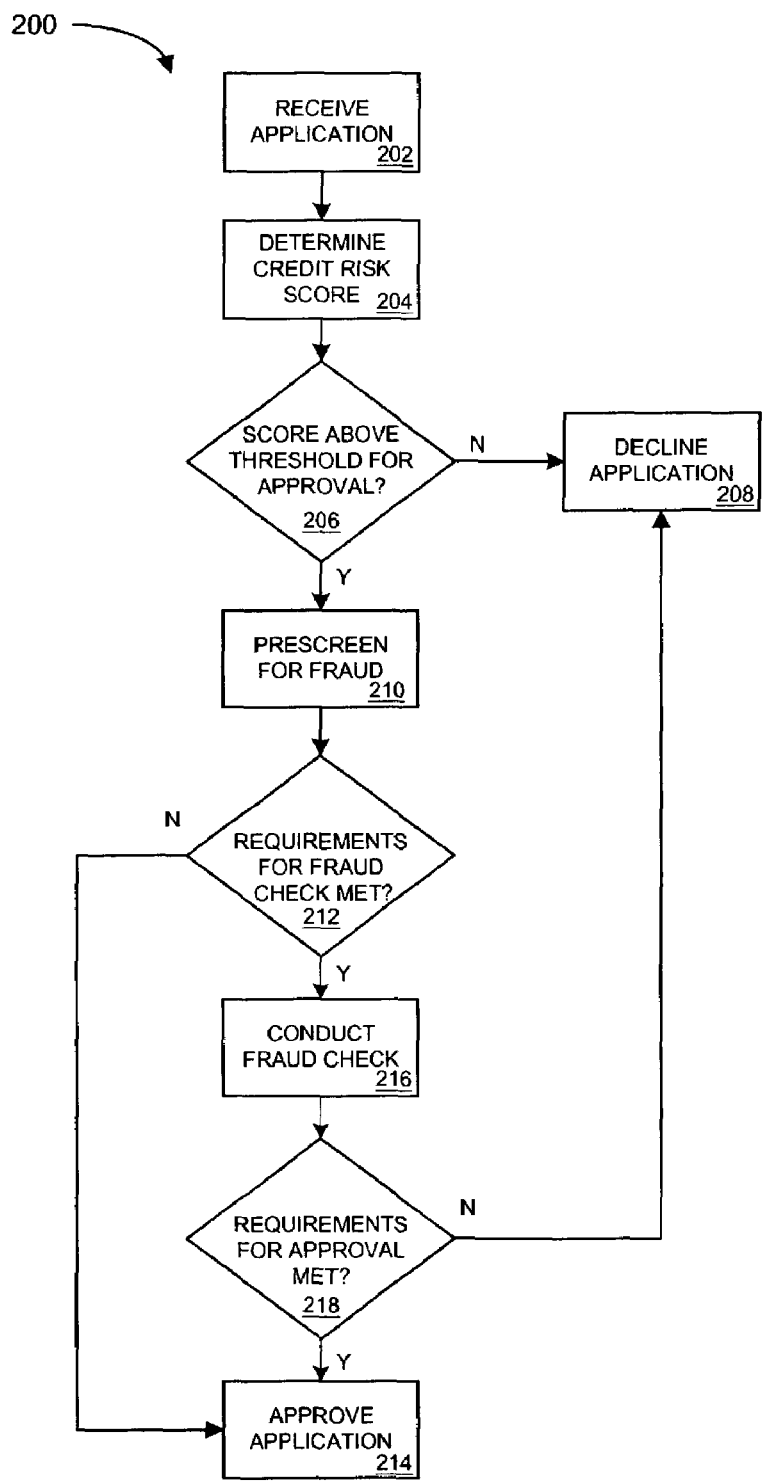
FIG. 2 is a flowchart of a first embodiment of a method in accordance with the present invention and that may be used with the system of FIG. 1.

Reference is now made to FIG. 2, where a flowchart 200 is shown that illustrates one example of when a true name fraud determination might be made as part of an application for credit.

During a step 202, a credit application is received. The credit application might be for a credit card or other financial product. For example, a person may submit an application to obtain a merchant branded credit card or to establish a credit line with the merchant. The credit application may be received by the application processor 110 from an applicant, from a merchant on behalf of an applicant, etc. For example, an applicant might apply online for credit, or submit an application for credit, via the web server 108, which then forwards the application to the application processor 110. As another example, the applicant might fill out a credit application while visiting a merchant or at the merchant's location. An employee of the merchant might provide the application information to the application processor 110. Alternatively, the applicant might use a kiosk located at the merchant (e.g., a merchant device) to provide information for the application which is the provided or submitted by the kiosk to the application processor 110.

During a step 204, an initial credit score or determination might be made as to whether the applicant meets the minimum requirements for approval of the credit application. For example, upon receiving the application during the step 202, the application processor 110 might obtain a credit report from the credit bureau 118 for the applicant and use information in the credit report to form an initial determination of the application. In some embodiments, the application processor 110 may obtain information from other sources (e.g., the information source 114), request additional information from the applicant, etc., as part of or during the step 204. The determination made during the step 204 may not include an evaluation of the application for true name fraud and may instead assume that everything in the application is true.

During a step 206, a determination is made regarding whether or not the application received during the step 202 meets the minimum or threshold scoring or other requirements necessary for the application to be approved. For example, a credit risk or worthiness score may use a scale between one and one thousand. The lower the credit risk score for an application, the higher the risk of the application. For example, a lower credit risk score for an applicant may be an indication that the applicant previously has missed one or more payments on one or more bills, defaulted on a loan, declared bankruptcy, been convicted of a crime, etc. An application having a credit risk score of four hundred or lower might be declined automatically while an application having a credit risk score between four hundred and one thousand might proceed. In some embodiments, an application or applicant having a credit risk score greater than a designated threshold (e.g., nine hundred and fifty) might be approved automatically. Different merchants or other customer for which credit applications are processed may have or set different thresholds. In some embodiments, the method 200 may include establishing or determining the thresholds or credit risk scoring system used, receiving information regarding the thresholds or credit risk scoring system used, etc.

If the application (or its associated applicant) does not meet a designated requirement(s), the application is denied during a step 208. In some embodiments, the step 208 may include sending the applicant a letter, email, or other communication indicating that the application was denied, the reason for the denial of the application, etc.

During a step 210, if the application has at least met the minimum credit risk scoring or other requirements necessary for approval of credit, the application may be screened for fraud. In some embodiments, the step 210 may be part of or combined with the step 204. In other embodiments, however, screening an application for fraud during the step 210 may be more time consuming, expensive or difficult than conducting the initial qualification check during the step 204. Thus, filtering out applications that can be identified easily or cheaply as applications that will be denied prior to the step 210 may improve the overall application review process and eliminate the additional costs and time that may be involved with the step 210.

There are lots of ways in which the step 210 might be conducted. For example, fraud bureau products, more comprehensive or elaborate credit risk scoring models, fraud scoring models, etc. may be used. For example, a credit risk scoring model may produce a credit risk score between zero and two hundred. The higher the credit risk score for a credit application, the lower the risk for approving the application. An application having a credit risk score of one hundred and fifty or higher might be approved automatically while an application having a credit risk score less than one hundred and fifty might undergo further evaluation for potential fraud. In some embodiments, an application showing a clear indication of fraud or previous bad credit (e.g., a credit risk score lower than fifty) may be decline automatically. In some embodiments, the method 200 may include establishing or determining the thresholds or credit risk scoring system used, receiving information regarding the thresholds or scoring system used, etc. for the step 212.

During a step 212, a determination is made regarding whether or not the application needs further fraud checking based on the determination made during the step 210. More specifically, the determination may include an evaluation of whether the application needs additional true name fraud evaluation. In some embodiments, applications may be selected at random for additional fraud checking, particularly true name fraud checking. In other embodiments, different mechanisms may be used to determine or select one or more applications that will or should undergo additional fraud checking.

In some embodiments, applications may be screened during the step 210 according to various criteria. For example, all applications from a particular merchant might be directed for further fraud checking. As another example, all applications from merchants dealing in jewelry or consumer electronic products may be directed for further fraud checking. As a further example, if the distance between the applicant's stated address and the address for the merchant at which the applicant is applying for credit is greater than a threshold, the application may be directed for further fraud checking. As another example, applications provided from a geographic area or merchant known to be targeted by people filing improper applications may be more likely to receive additional scrutiny and fraud checking.

In some embodiments, the avenue by which the application was provided may have a designated probability of being selected for additional fraud checking. For example, an application provided or submitted online may be more likely to receive additional fraud checking than an application provided or submitted in person at a merchant.

In some embodiments, trend reporting or analysis of fraudulent credit applications may indicate the presence of a fraud ring, a similar modus operandi or other systemic clues that may cause an application for credit to be singled out for thorough examination. For example, a trend may develop that illustrates that a fraud ring is using social security numbers from a list. Thus, a rule may be created that subjects any credit application using one of the social security numbers to through examination.

In some embodiments, the application may not be rejected during or as a result of the step 212. Rather, the determination may be limited to approving the application or conducting further fraud checks regarding the application.

If the application needs no further checking, the application can be approved during a step 214. In some embodiments, the step 214 may include notifying the applicant of the approval of the application.

If the application requires further fraud checking, additional fraud checking can be conducted during a step 216. In some embodiments, the additional fraud checking may be done by the true name fraud processor 102. In other embodiments, a human user may be involved in some or all of the additional fraud checking conducted during the step 216. Additional information regarding the step 216 is provided below. In some embodiments, the step 216 may be part of or included in the step 210 provided above.

In other embodiments, however, screening an application for fraud during the step 216 may be more time consuming, expensive or difficult than conducting the initial qualification check during the step 204 or the prescreening conducted during the step 210. Thus, filtering out applications that can be identified easily or cheaply as applications that will be denied or approved prior to the step 216 may improve the overall application review process and eliminate the additional costs and time that may be involved with the step 216.

During a step 218, a determination can be made as to whether the application meets the requirements for approval. If it does, the application can be approved during the step 214. If it does not, the application can be denied during the step 208 as previously discussed above.

Figure 3:
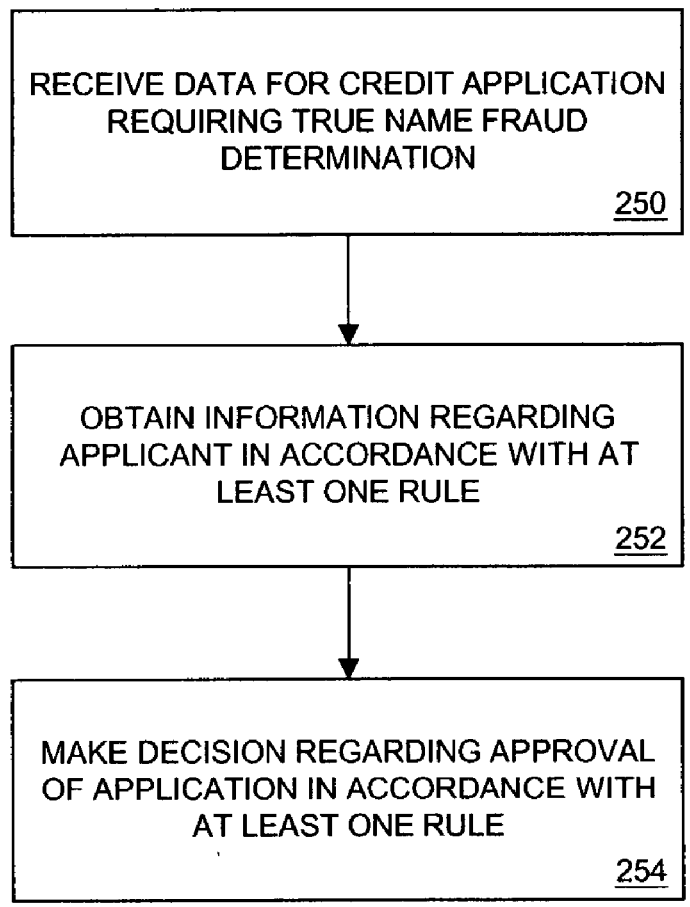
FIG. 3 is a flowchart of a first embodiment of the conduct fraud check step of the method of FIG. 2.

Reference is now made to FIG. 3, where a flow chart is shown which represents the operation of a first embodiment of the conduct fraud check step 216 of the method 200. In some embodiments, some or all of the steps may be performed or completed by the true name fraud processor 102, the application processor 110 and/or another device or entity, as will be discussed in more detail below. For purposes of explanation, but not limitation, the steps illustrated in FIG. 3 will be assumed to be implemented or conducted by the true name fraud processor 102.

Processing begins at a step 250 during which data is received or otherwise determined for a credit application. There are many ways in which the step 250 may be implemented. For example, in some examples, an applicant may send a credit application directly to the application processor 110 from a user device 104. Alternatively, the application processor 110 may receive an application from a merchant on behalf of the applicant (e.g., the applicant may fill out the application while at the merchant) via a merchant device 106.

The true name fraud processor 102 may receive one or more applications for evaluation from the application processor 110. The application processor 110 may prioritize applications and provide them to the true name fraud processor 102 for evaluation and review. Alternatively, the application processor 110 may inform the true name fraud processor 102 of an application to review or otherwise provide an identifier of the application to the true name fraud processor 102. The true name fraud processor 102 may then retrieve or download the application data or information during the step 216. In some embodiments, the true name fraud processor 102 may prioritize or queue credit applications for review after receiving them from the application processor 110.

In embodiments where the application processor 110 and/or the true name fraud processor 102 prioritize applications for review in accordance, one or more rules or criterion may be used for the prioritization. For example, applications may be prioritized in accordance with the channel of submission of the application. Thus, applications submitted online may be prioritized over applications submitted via the mail. As another example, an application may receive a higher and higher priority the longer the application remains in the queue for processing. Thus, an application submitted one day ago might receive a higher priority than an application submitted one hour ago. As a third example, customers for whom credit applications are evaluated may dictate that their applications must be evaluated within a designated period of time. Applications may be prioritized and reprioritized over time as needed to satisfy requirements for one or more of the customers or merchants.

In some embodiments, the method 216 may include prioritizing one or more applications for true name fraud analysis, receiving or otherwise determining one or more rules for prioritizing applications for true name fraud analysis, etc.

The application information received during the step 250 may include information provided by the applicant as part of the application or by communication with the applicant to obtain additional information. In some embodiments, the true name fraud processor 102, the application processor 110, and/or some other device may include or access an application or applicant information database to store or receive information regarding an application. An application or applicant information database may include information submitted as part of the application, information regarding the channel of delivery or submission or the application, the date/time of the submission of the application, a priority indicator or designation for the application, etc.

In some embodiments, once application information is received during the step 250, some or all of the information may be displayed on an interface or queued for use by a user via the interface, as will be discussed in more detail below.

During a step 252, information is obtained regarding the applicant or application in accordance with at least one rule governing retrieval and/or use of such information and/or the approval process for the application. During a step 254, a decision is made regarding the application based on the information received. In some embodiments, the steps 252 and 254 may be combined into a single step or be considered as part of a single step. Different rules may be used to govern when information is obtained during the step 252 and/or how the information is used to make a decision regarding approval or rejection of an application during the step 254 or processing of the application during the step 254.

There are many rules that might be used to govern or determine when information is retrieved, what type of information is retrieved, and how the information is used in the application review process. For example, a set of rules may govern when an application is approved or denied during the step 216. More specifically, a rule may govern or decide when a higher level of scrutiny is to be applied to an application. For example, when an application is subjected to a low level of scrutiny, approval or rejection of the application may be based only on an initial fraud risk score. When the application is subjected to a higher level of scrutiny, additional information may be needed before a final decision regarding approval or denial of the application can be made. One or more rules may be used to determine when and how to subject an application to additional scrutiny and how an application is to be evaluated.

As one example of the step 252 and the step 254, once the true name fraud processor 102 has received an application during the step 250, the true name fraud processor 102 may obtain or otherwise determine an initial fraud risk score or other initial fraud risk assessment associated with the associated applicant or the application. The initial fraud risk score may be based on the information provided in the application. For example, in some embodiments, the true name fraud processor 102 may send some or all of the information in the application or obtained during the step 250 to a credit bureau or other information source that can conduct or provide an initial fraud risk score or other assessment based on the information. Typically, such an initial fraud risk score or assessment is provided for a certain fee (e.g., twenty cents) per application. An information source might provide the initial fraud risk score or assessment without providing any information underlying how the information source computed the initial fraud risk score or assessment and/or without providing any additional information the information source may have regarding the applicant.

Based on the initial fraud risk score or assessment received or determined, the application may be rejected, approved or subjected to further processing. For example, suppose the only possible initial fraud risk scores returned from the information source are ten, twenty, thirty, forty and fifty. The rules used or invoked during the step 252 and 254 may dictate or specify that applications having an initial fraud risk score or ten or twenty are automatically rejected while applications having an initial fraud risk score of forty or fifty are automatically approved. Thus, the initial fraud risk scores of ten and twenty indicate a high risk or probability of the application (or applicant) being fraudulent while the initial fraud risk scores of forty and fifty indicate a comfortable or low risk or probability of the application (or applicant) being fraudulent.

While the initial fraud risk scores of ten, twenty, forty and fifty provide an immediate answer or determination regarding approval or disapproval of the application, an initial fraud risk score of thirty, on the other hand, may require further processing of the application in accordance with one or more other rules. The other rule(s) may require that additional information be obtained or other credit bureaus or information sources be contacted, typically for a fee. In addition, the other rules may require that the applicant be contacted to verify information or to request that the applicant submit additional or corroborating information or documents (e.g., a bill showing the applicant's name and home address, a paycheck stub showing the applicant's employer name and monthly salary) to verify aspects of or information provided in the application.

As another example, an information source might provide an initial fraud risk score between one and one thousand for an application with a higher score indicating a higher level of trust (or lower level of risk) associated with the application. An application having score below two hundred may be rejected automatically while an application having an initial fraud risk score above seven hundred may be approved automatically. An application having an initial fraud risk score between two hundred and seven hundred may be subjected to additional examination in accordance with one or more rules.

The rules implemented in the steps 252 and 254 may help to make fraud determinations while limiting the request for additional information when such additional information is not necessary to make a decision regarding the application. For example, suppose an initial fraud risk score or assessment for an application can be obtained for twenty cents and information underlying the initial fraud risk score or assessment can be obtained for fifty cents. Thus, the initial fraud risk score or assessment and the underlying information for an application can both be obtained for seventy cents. However, if an application can be rejected or approved solely based on an initial fraud risk score (e.g., the initial fraud risk score is ten, twenty, forty or fifty as discussed in the example above), the additional information underlying the initial fraud risk score is not necessary to make a decision regarding the application. Thus, if the true name fraud processor 102 requests the additional information in all cases, it may pay for or generate unnecessary costs. However, in accordance with a defined rule the true name fraud processor 102 may request the additional information underlying the initial fraud risk score, and pay the additional fifty cents, only when the initial fraud risk score is thirty and further processing or information is necessary for making a decision regarding approval or denial of the application.

In some embodiments, the underlying information received from an information source may include such things as the address, telephone number, etc. that the information source associates with the social security number or name provided by the true name fraud processor. As another example, the true name fraud processor 102 may provide the applicant's name, address, social security number, etc. to the information source. The underlying information may include information obtained by the information source that it associates with the name, address, social security number, etc. and indicate any discrepancies between the information provided by the true name processor 102 and information obtained by the information source from other sources. For example, the underlying information for an initial fraud risk score of thirty for an application might point out a mismatch between the social security number provided on the application as being the applicant's social security number and the social security number for the applicant that the information source has obtained from other sources that is associated with the applicant. Such a discrepancy may be a typographical error on behalf of the applicant or information source or a deliberate attempt at fraud. The rules used during the step 252 may govern what to do regarding such a mismatch. For example, if two numbers are merely transposed in the social security number, a typographical mistake and a low risk of a fraudulent application might be assumed. A more significant social security number mismatch, such as when a social security number belongs to a person known to be deceased, a social security number issued before the named applicant was born, a social security number known to be stolen or involved in a previous fraudulent application, may be considered an indication or high risk of fraud and result in a rejection of the application in accordance with a pre-established rule.

When additional information is needed, it may be obtained and processed in accordance with many types of rules. For example, using the example discussed above, an initial fraud risk score of thirty may require that the underlying information associated with the initial fraud risk score be obtained from the source that provided the initial fraud risk score. Alternatively, or in addition, an initial fraud risk score of thirty may require that information from another information source be obtained (presumably for a fee) for comparison to, or augmentation of, the information received from the first information source. More specific handling rules also may be implemented. As one such example, if the underlying information indicates that the telephone number provided by the applicant on the application is a cellular telephone number instead of a residential telephone number, additional processing may be needed to verify the applicant's identity or the accuracy of information on the application. For example, in accordance with a pre-established rule, an attempt may be made to contact the applicant to obtain a home telephone number for the applicant or to verify that the applicant is associated with the cellular telephone number. The true name fraud processor 102 may provide the application to a human operator to make the telephone call or indicate to the operator that such a telephone call should be made.

When requesting information regarding an application or applicant, the true name fraud processor 102 may format or send a request differently for different information sources. For example, if the true name fraud processor 102 is attempting to verify the address and telephone number for a person, a first information source may require that the true name fraud processor 102 format the request in a specific format (e.g., social security number of the applicant followed by name of the applicant) while a second information source may want a different format. The information used in the request may be taken from the information provided in the application. Thus, in some embodiments, the methods disclosed herein may include the true name fraud processor 102 or another device or entity formatting or tailoring a request for information to a specific information source, identifying or otherwise determining a format used by a specific information source for requests for information, etc.

Figure 4:
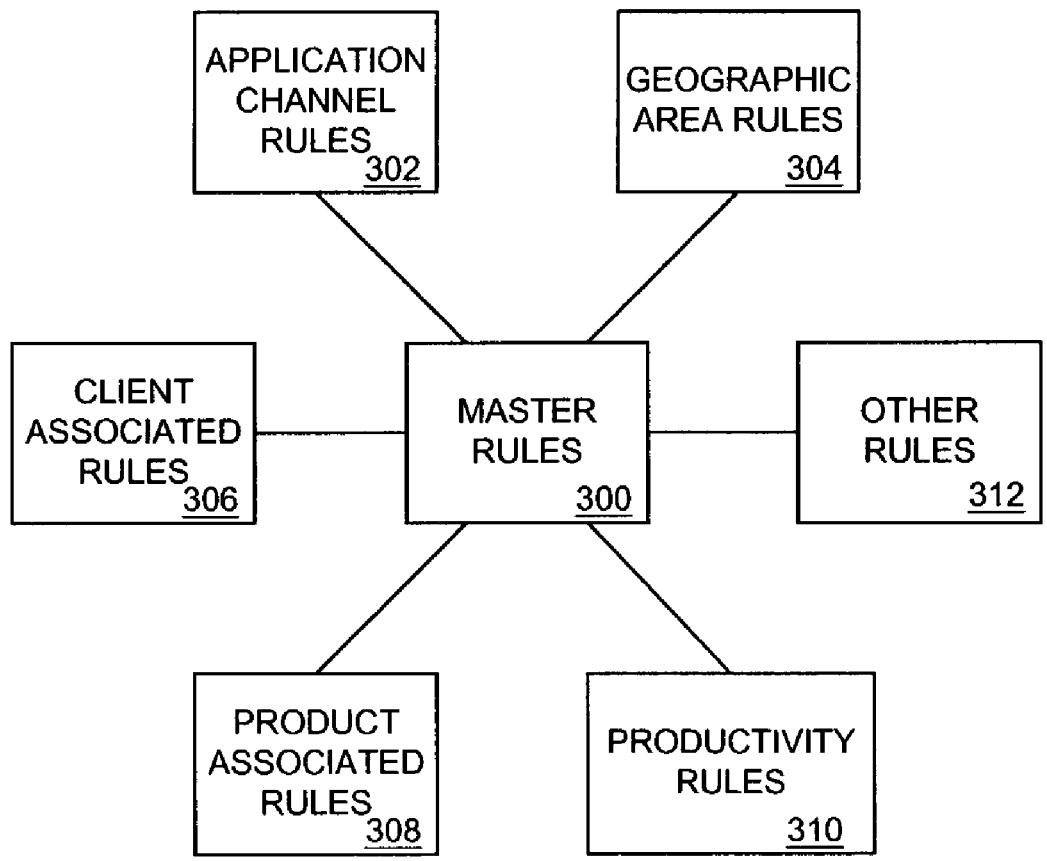
FIG. 4 is a representative illustration of rules that may be used in the conduct fraud check step of the method of FIG. 2.

Now referring to FIG. 4, a representative set of rules is shown that may be used by or included in a master set of rules 300. For example, the master rules 300 may use or include rules focusing on different areas or criteria such as, for example, application channel rules 302, geographic area rules 304, client associated rules 306, product associated rules 308, productivity rules 310, and any other rules 312. The names and organization of the rules are provided merely for convenience of discussion and rules may apply to more than one category. The rules may be used as part of the steps 252 and/or 254 previously discussed above. The use of different rules for an application may require that different amounts or types of information be obtained or confirmed before an application can be approved. Also, different rules may dictate that information from different sources (which may include additional information from an applicant) be obtained for use in evaluating an application.

The application channel rules 302 may address or review how an application is provided. For example, applications submitted via a kiosk or online may have a higher rate of fraud than do applications submitted in person at a merchant. If the underlying information for an initial fraud risk score of thirty or other initial fraud risk assessment is obtained, fewer discrepancies or fraud indicating characteristics may be allowed for an application provided online or via a kiosk (versus an application mailed in or submitted in person) before the application is rejected. As another example, information from additional sources may be obtained automatically for comparison when an application is submitted online by an applicant versus in person by the applicant.

The geographic channel rules 304 may be used to address different types or amounts of fraudulent application activity that may occur in different geographic areas. It is not unusual for a fraud ring to move across geographic areas, or for different types of fraudulent activity to take place in different geographic areas. Thus, different types of rules may apply to different geographic areas. For example, a rule might specify that if an application received from a designated geographic area, the initial fraud risk score and its underlying data must be obtained and compared against data obtained from another information source. If there is any mismatch or discrepancy between the data obtained from the two different information sources, the application might be rejected (even if the initial fraud risk score is forty or fifty) or queued for further processing (e.g., the applicant may be contacted and asked to provide a bill or other verification of home address). By obtaining the additional information only when necessary or as required by the geographic rules, some costs and fees associated with evaluating an application be avoided.

The client associated rules 306 may be used to address different types or levels of fraud that may be experienced by applications generated by applicants at various merchants. In some embodiments, some or all of the client associated rules 306 may be formulated or required by the true name fraud processor 102 and/or one or more merchants. For example, the true name fraud processor 102 may review a credit application submitted by an applicant at a merchant's location. If the application is approved, the applicant may receive a merchant branded credit card, credit account, store only credit card, etc. Different merchants may want different credit applications reviewed in accordance with different rules. For example, different merchants may be willing to accept a higher risk of a fraudulent application being accepted if it reduces the chances of a non-fraudulent application being rejected. Other merchants may not be willing to accept the higher risk, even if it means that a non-fraudulent application may have a higher chance of being rejected. As another example, a credit card issuer may allow different merchants to have different credit limits for private labeled credit cards issued by the credit card issuer on behalf of the merchant. A merchant whose account holders have a higher average credit line may be subject to a higher level of scrutiny. In another example, commercial or business accounts may be scrutinized more thoroughly than consumer accounts since the commercial accounts often will have a higher authorized credit line and be subjected to different rules. As a further example, a merchant who is getting ready to offer a new promotion (e.g., a credit card that does not require payments for six months) may want applications for the new promotion to be scrutinized more carefully than normal because there might be an increased fraud rate due to increased visibility of the merchant during the promotion. In another example, applications generated by or on behalf of different merchants may receive different results just based on the initial fraud risk score. A first merchant might allow an application having an initial fraud risk score of forty or fifty to be approved automatically. A second merchant might allow only applications having an initial fraud risk score of fifty to be approved automatically while requiring that scores of thirty or forty being subjected to additional scrutiny. In yet another example, different contractual obligations between the entity operating the true name fraud processor 102 and merchants may result in different rules being applied. More specifically, in some circumstances the entity may be required to reimburse the merchant for some or all of the losses incurred by the merchant as a result of a fraudulent application being approved by the true name fraud processor 102. Thus, the entity may subject all of the applications related to such merchant to a higher level of scrutiny. Under a different contract, a different merchant may bear the majority of fraud losses. Thus, the entity may use a lower level of scrutiny for applications relating to the second merchant. In still another example, a merchant may dictate that fraud losses should not exceed a designated threshold amount or percentage of total sales. Thus, the rules applied to applications relating to the merchant may vary over time to keep the results with the target. In an even further example, a merchant may designate a minimum number or percentage of applications that must be subjected to higher scrutiny, even if in some cases such higher scrutiny is not warranted or required in accordance with other rules.

The product associated rules 308 may be used to address different types or levels of fraud that occur with respect to different product offerings provided by merchants. Thus, the product associated rules 308 may overlap with the merchant or client associated rules 306. For example, merchants in the home improvement or furniture business often have customers that change their addresses frequently. As a result, the true name fraud processor may obtain and compare information from multiple sources when such customers apply for credit with the merchant. As another example, merchants selling jewelry, electronic items, and gift cards tend to have higher fraud rates than merchants selling other products. Thus, applications relating to such merchants might be subjected to higher scrutiny and the true name fraud processor 102 may obtain information from additional information sources for use in evaluating such applications in accordance with one or more established rules.

The productivity rules 310 may be used to address the ability or success of the true name fraud processor 102 or other devices or people involved in fraud evaluation to process applications. For example, a rule may dictate that all applications having an initial fraud risk score of forty or fifty are automatically approved unless the rate of approved fraudulent applications exceeds one percent. If the threshold is exceeded, applications having an initial fraud risk score of forty may be subjected to additional scrutiny while applications having an initial fraud risk score of fifty still may be approved automatically. As another example, applications have an initial fraud risk score of forty may be subjected to additional scrutiny until such time as the backlog of applications reaches a certain number or percentage, the percentage of applications receiving higher scrutiny reaches a designated number, the average time required to review and process an application once it enters the queue for the true name processor 102 reaches or exceeds a threshold amount of time, etc. Once one or more of the designated conditions are met, applications having an initial fraud risk score of forty may be approved automatically. As another example, in cases where people or other devices are assisting in the evaluation of applications, the availability of such people or devices may govern when higher or human scrutiny is to be applied to applications The other rules 312 may include any other rules that may be used or applied when evaluating the application. New rules may be added over time and existing rules modified. Metrics may be used to measure the degree to which existing rules are incorrectly approving fraudulent applications and/or incorrectly rejecting non-fraudulent applications. From such metrics, changes or additions may be made to the rules used for evaluating applications for fraud.

In some embodiments, the other rules 312 also may include rules provided by government agencies or rules used to comply with one or more laws. For example, a government agency might provide a list of names of known criminals, terrorists, etc. and require that all credit applications submitted using one of the names be denied automatically regardless of any other information submitted as part of the credit applications. The rules might require that the government be notified of any credit application submitted using one of the names. In some embodiments, the other rules 312 may be used to verify the existence or identify of a company for a commercial account and/or to manage how and when information is obtained or used to evaluate applications for a commercial account. In some embodiments, the other rules 312 may include rules directed to assisting an operator in making a decision regarding an application, resolving conflicting applicant information, using incomplete information, etc.

In some embodiments, information regarding one or more rules may be stored in or accessed from a rules information database. In some embodiments the true name fraud processor 102 may include or have access to one or more rule information databases.

A rules information database may include information such as the date/time a rule was created or enacted, the number of times a rule has been used or modified, a code or other identified for the rule, actions or other events that result from implementation of a rule, instructions or suggestions to a user conducting an application review when a rule is or should be invoked, instructions or suggestions that should be displayed to a user or on an interface or device when the rule is or should be invoked, the results of an implementation of a rule for one or more specific credit applications, etc. In some embodiments, a rules information database may include information regarding when or under what circumstances information from an information source should or can be obtained, how the information might be used during an evaluation of application, etc.

Figure 5:
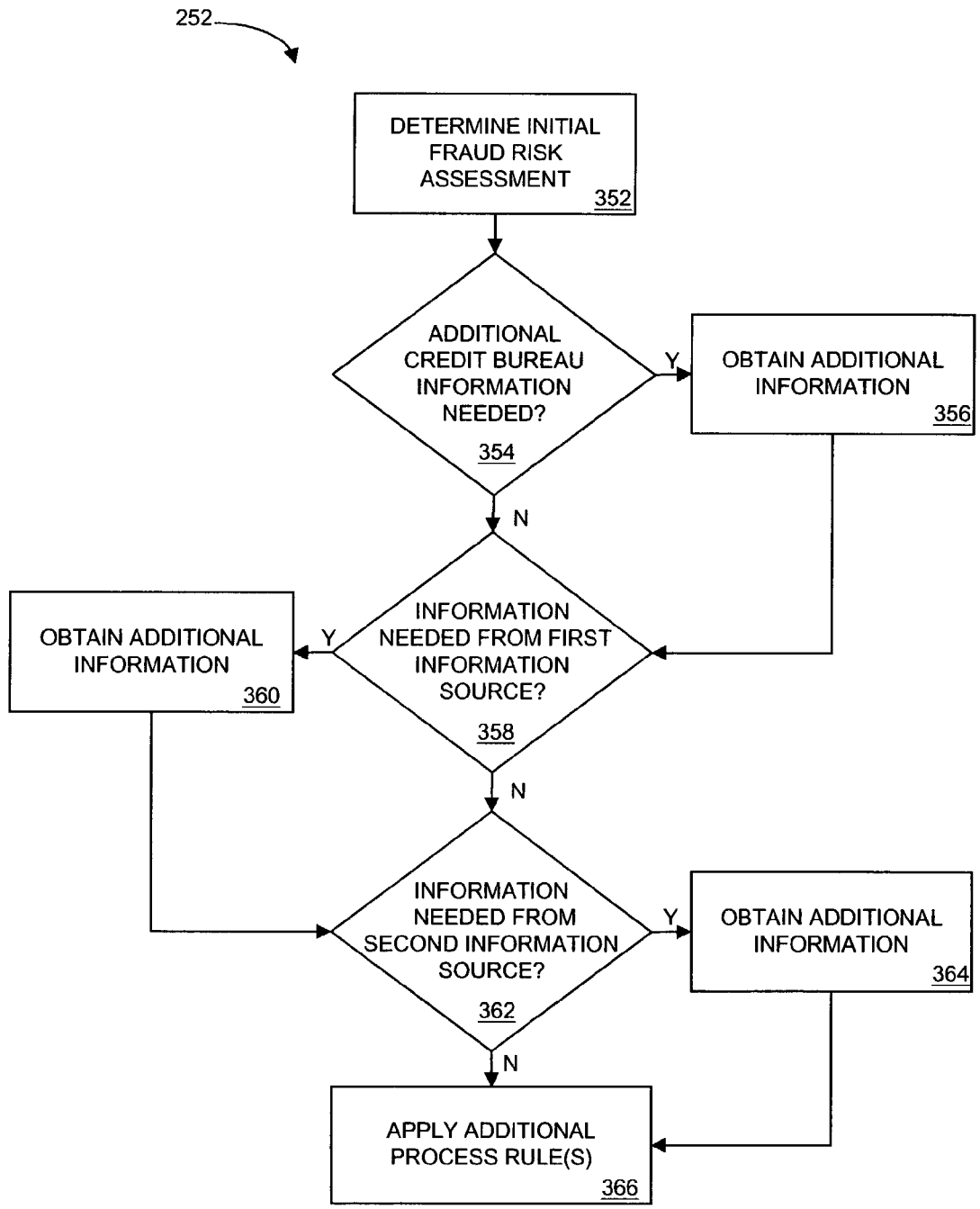
FIG. 5 is a flowchart of a second embodiment of the conduct fraud check step of the method of FIG. 2.

Now referring to FIG. 5, another example illustration of the step 252 (which may include all or part of the step 254) is provided. The following discussion will assume that the step 252 is being implemented at least in part by the true name fraud processor 102.

Processing begins at a step 352 during which an initial fraud risk score or other initial fraud risk assessment is obtained or determined for an application for which data is received during the step 250 (see FIG. 3). As previously discussed above, in some embodiments the true name fraud processor 102 may get an initial fraud risk score information from a credit bureau or other credit scoring advisory service. In order to receive the initial fraud risk score, the true name fraud processor 102 may send a request or message to the credit bureau that contains some or all of the information included in the application. The credit bureau may than send a return message or data indicative of the initial fraud risk score.

In some embodiments, information useful in determining or making an initial fraud risk score or assessment also might be obtained from the credit risk score determination made during the step 204. For example, as part of conducting the step 204, a credit report may be obtained from a credit bureau by the application processor 102. The credit report may be augmented with flags or other indicators (e.g., indications of social security number mismatches) that may be useful in making the initial fraud risk assessment or determining an initial fraud risk score. Thus, in some embodiments, the step 352 may include obtaining information from the application processor 102, from a credit report or other data obtained during the step 204, or from data previously obtained from a credit bureau.

During a step 354, a determination is made regarding whether additional information is needed from the credit bureau. For example, different initial fraud risk scores may result in different actions taking place. As described in the examples above, applications having initial fraud risk scores of ten, twenty, may be denied automatically while applications having initial fraud risk scores of forty or fifty may be approved automatically. Thus, no additional information from the credit bureau may be needed. Applications having initial fraud risk scores of thirty may require additional information from the credit bureau or a different information source. The information may be obtained and used in accordance with one or more rules.

If additional information is needed from the credit bureau, the step 252 proceeds to the step 356 where the additional information needed from the credit bureau is requested or obtained. As described in the examples above, in some embodiments the additional information may be or include information used to create the initial fraud risk score, underlying information regarding how the initial fraud risk score was created, etc.

After the step 354 if no further information from the credit bureau is needed, or after the step 356 if additional information from the credit bureau is needed, the step 252 proceeds to step 358 during which it is determined whether information from a first information source is required. Such a determination may be made in conjunction or accordance with one or more rules that may be established regarding approval or denial of an application as previously discussed above. For example, geographic rules may require that information regarding an applicant be obtained from the first information source and compared against the information provided in the application and the information obtained from the credit bureau during the step 362.

If information is needed from the first information source, it may be obtained during a step 360. The step 360 is similar to the steps 352 and 356 previously discussed above. If no information is needed from the first information source, the step 252 proceeds to a step 362.

The step 362 is similar to the step 358. During the step 362, a determination is made regarding whether information from a second information source is needed. Such a determination may be made in conjunction or accordance with one or more rules that may be established regarding approval or denial of an application as previously discussed above. If information is needed from the second information source, it may be obtained during a step 364. For example, if the information obtained from the first information source is incomplete or provides inconclusive results, information may be obtained from the second information source to complement or corroborate the information received from the first information source. The step 362 is similar to the steps 352, 356 and 362 previously discussed above. If no information is needed from the second information source, the step 252 proceeds to a step 366 during which additional process rules may be applied to make a determination regarding an application.

By breaking down an application review process into multiple information retrievals and/or retrieving information only when such information is necessary, processing of applications may be handled more quickly and efficiently. For example, suppose that obtaining the initial fraud risk score information for an application during the step 352 costs twenty cents per application, obtaining information from the credit bureau during the step 356 costs fifty cents per application, obtaining information from the first information source during the step 360 costs thirty cents per application, and obtaining information from the second information source during the step 364 costs forty cents per application. If an application can be approved or rejected solely based on the initial fraud risk score information obtained during the step 352 in accordance with one or more rules, a cost savings is obtained if information is not requested or obtained during the steps 356, 360 and 366. Similarly, if an application can be approved or rejected solely based on the initial fraud risk score information obtained during the step 352 and information obtained from the first information source during the step 360 in accordance with one or more rules, a cost savings is obtained if information is not requested or obtained during the steps 356 and 366. Thus, the rules in place for use during the step 252 and/or the step 254 may allow rules to be implemented governing approval or rejection of an application in a cost effective manner. In addition, retrieving information only when such information is necessary may reduce the amount of time needed to process an application or make a decision regarding approval or rejection of the application. In addition, the faster an application can be approved or denied, the faster a decision regarding the application can be provided to the applicant, and the less time the true name fraud processor 102 need spend evaluating the application, thereby improving the efficiency of the true name fraud processor 102.

True Name Fraud Processor

Figure 6:
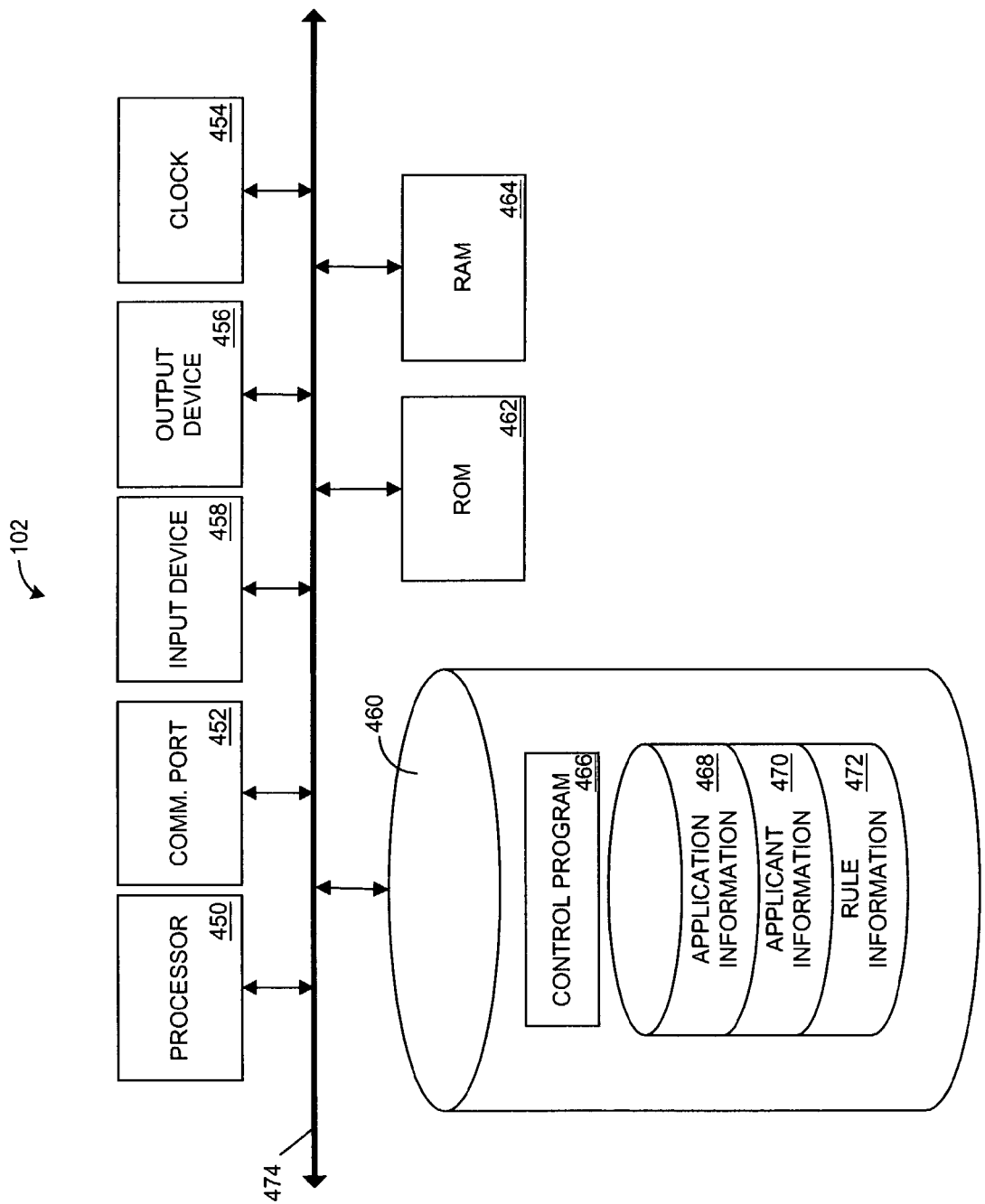
FIG. 6 is a block diagram of components for an embodiment of a true name processor of FIG. 1.

Now referring to FIG. 6, a representative block diagram of the true name fraud processor 102 is illustrated. The true name fraud processor 102 may include a processor, microchip, central processing unit, or computer 450 that is in communication with or otherwise uses or includes one or more communication ports 452 for communicating with user devices, the application processor 110 and/or other devices. Communication ports may include such things as local area network adapters, wireless communication devices, Bluetooth technology, etc. The true name fraud processor 102 also may include an internal clock element 454 to maintain an accurate time and date for the true name fraud processor 102, create time stamps for communications received or sent by the true name fraud processor 102, etc.

If desired, the true name fraud processor 102 may include one or more output devices 456 such as a printer, infrared or other transmitter, antenna, audio speaker, display screen or monitor, text to speech converter, etc., as well as one or more input devices 458 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the true name fraud processor 102 may include a memory or data storage device 460 to store information, software, databases, communications, device drivers, applications, etc. The memory or data storage device 260 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The true name fraud processor 102 also may include separate ROM 462 and RAM 464.

The processor 250 and the data storage device 460 in the true name fraud processor 102 each may be, for example: (i) located entirely within a single computer or other computing device; or (ii) connected to each other by a remote communication medium, such as a serial port cable, telephone line or radio frequency transceiver. In one embodiment, the true name fraud processor 102 may comprise one or more computers that are connected to a remote server computer for maintaining databases.

A conventional personal computer or workstation with sufficient memory and processing capability may be used as the true name fraud processor 102. In one embodiment, the true name fraud processor 102 operates as or includes a Web server for an Internet environment. The true name fraud processor 102 preferably is capable of high volume transaction processing, performing a significant number of mathematical calculations in processing communications and database searches. A Pentium™ microprocessor such as the Pentium III™ or IV™ microprocessor, manufactured by Intel Corporation may be used for the processor 450. Equivalent processors are available from Motorola, Inc., AMD, or Sun Microsystems, Inc. The processor 450 also may comprise one or more microprocessors, computers, computer systems, etc.

Software may be resident and operating or operational on the true name fraud processor 102. The software may be stored on the data storage device 460 and may include a control program 466 for operating the true name fraud processor 102, databases, etc. The control program 466 may control the processor 450. The processor 450 may perform instructions of the control program 466, and thereby operates in accordance with the present invention, and particularly in accordance with the methods described in detail herein. The control program 466 may be stored in a compressed, uncompiled and/or encrypted format. The control program 466 furthermore includes program elements that may be necessary, such as an operating system, a database management system and device drivers for allowing the processor 450 to interface with peripheral devices, databases, etc. Appropriate program elements are known to those skilled in the art, and need not be described in detail herein.

The true name fraud processor 102 also may include or store information regarding applicants, applications, user devices, information sources, communications, etc. For example, information regarding one or more credit applications may be stored in an application information database 468 for use by the true name fraud processor 102 or another device or entity. Information regarding one or more applicants may be stored in an applicant information database 470 for use by the true name fraud processor 102 or another device or entity and information regarding one or more business or process rules for evaluating credit applications may be stored in a rules information database 472 for use by the true name fraud processor 102 or another device or entity. In some embodiments, some or all of one or more of the databases may be stored or mirrored remotely from the true name fraud processor 102.

The true name fraud processor 102 also may include appropriate system security programs, safeguards, and firewalls to protect personal information of applicants. In addition, such security programs, safeguards, and firewalls may protect and segregate proprietary merchant information. For example, a merchant may require that its information be protected and not shared with other merchants or mixed with data provided by or regarding other merchants. In some embodiments, information regarding one or more merchants may be stored in an applicant information database for use by the true name fraud processor and/or another device or entity.

In some embodiments, the true name fraud processor 102 may be designed to incorporate redundant components or systems and/or back-up capabilities that will transfer functionality across components if any of the components of the true name fraud processor 102 go down, experience failure, or become unavailable or un-operational.

According to an embodiment of the present invention, the instructions of the control program may be read into a main memory from another computer-readable medium, such as from the ROM 462 to the RAM 464. Execution of sequences of the instructions in the control program causes the processor 450 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 450, communication port 452, clock 454, output device 456, input device 458, data storage device 460, ROM 462, and RAM 464 may communicate or be connected directly or indirectly in a variety of ways. For example, the processor 450, communication port 452, clock 454, output device 456, input device 458, data storage device 460, ROM 462, and RAM 464 may be connected via a bus 474.

While a specific implementation and hardware configuration for the true name fraud processor 102 have been illustrated, it should be noted that other implementations and hardware configurations are possible and that no specific implementation or hardware configuration is needed. Thus, in some embodiments, not all of the components illustrated in FIG. 2 may be needed for a true name fraud processor server implementing the methods disclosed herein.

Interface

In some embodiments, the true name fraud processor 102 may include or provide an interface or dashboard for use in evaluating credit applications. An interface or dashboard may be particular helpful when a person or operator is involved in reviewing a credit application or needs to make or consent to a decision regarding a credit application. For example, the true name fraud processor 102 may evaluate an application in accordance with one or more rules and make a determination regarding whether the application should be approved or denied. The true name fraud processor 102 may query, or require that, the operator to consent to or agree with the determination made by the true name fraud processor 102. The interface may allow the operator to indicate agreement or disagreement with the determination made by the true name fraud processor 102

The interface may provide information from multiple vendors on a single screen for use in evaluating an application. In addition, operation of the interface, or display of information on or by the interface, may be governed by one or more rules that facilitate ease of use of the information and the interface. More specifically, information in the windows may be displayed according to specific rules or formats such that the information can be used efficiently and displayed consistently, regardless of how or where the information is obtained. For example, different information sources may provide information regarding the same applicant in different order, using different terms, etc. The interface may take the information from the different information sources and provide and provide it in a consistent manner on a screen.

In some embodiments, the true name processor 102 may support or facilitate multiple interfaces being used simultaneously by multiple people. For example, the true name processor 102 may include a server that supports multiple terminals or computers, each of which may have an interface displayed on it.

One potential interface 500 is illustrated in FIG. 7. The interface 500 may include multiple windows or screens 502, 504, 506, 508 on which various types and amounts of information can be displayed. In some embodiments, the interface 500 may be part of or include a conventional browser interface or browser buttons and/or be displayed on a display, monitor, computer screen, etc. In other embodiments of the invention, the windows 502, 504, 506, 508 may be arranged, sized or configured differently and more or less than four windows might be used. For example, the window 502 may appear only when information from the information source designated as "INFORMATION SOURCE 1" is received. In some embodiments, the interface 500 may include or display text boxes or pop-up windows for relaying or displaying messages, instructions or suggestions, application processing rules or guidelines, etc. to a user of the interface. In addition, in some embodiments, the interface 500 also may display the number of applications in the queue for review, statistics or metrics regarding reviewed applications, etc.

As illustrated in the interface 500, different windows may be used to display different information. For example, the window 504 may display information as provided in or related to an application. The information derived from or included in the application may include the name, address, telephone number, social security number, driver's license number, date of birth, employer name, date of birth, gender, etc. In addition, the application information may include an identification (e.g., 234154) of the client for whom the application is being processed (e.g., BIGCOM HOME STORE), an indication of the communication channel from which the application was received (e.g., INSTORE), which also is referred to as the "VIA" reference. The information also may include a "reason code" (e.g., R32) which may reference or identify the reason why the application was flagged or selected for further fraud processing during the step 212 (see FIG. 2). For example, the reason code "R32" may indicate that a discrepancy exists in the social security number (e.g., the social security number does not belong to the applicant, is not associated with the telephone number or address listed in the application).

The information displayed in the window 504 also may include information regarding when the application was submitted (e.g., May 1, 2002) and a credit limit (e.g., $500) associated with the application. The credit limit may be an amount being requested by the application or an amount previously determined with respect to the application. For example, the application processor 110 may determine a maximum credit limit when it receives an application for credit. The window 504 or some or all of the information in the window 504 may appear on the interface once data for a credit application is received during the step 250 (see FIG. 3).

In some embodiments, the windows 502, 508 may include information obtained or retrieved from a credit bureau or other information source. In some embodiments, the interface 500 may display information from credit bureaus or other information sources in formats or arrangements that facilitate ease of use. For example, when information is received from an information source during the step 360 (see FIG. 5), the information may be displayed in a particular format in the window 502. Such information may include address, telephone, or other information regarding the applicant. The window 502 reflects information requested for the person associated with the social security number 555-55-5555. Similarly, when information is received from a credit bureau during the step 356 (see FIG. 5), the information may be displayed in a particular format in the window 508. Such information may include financial account balance information, financial account type information (e.g., revolving, credit card, debit card, joint account), financial account use or payment history information, current and former address information, special messages (e.g., an indicator that the applicant has filed for bankruptcy, undergone a name change, or is known by more than one name), credit limit information for other financial products (e.g., a credit card), etc. The window 508 reflects information requested for the person having the first name "SUSAN" and the last name "JOHNSON" and/or the person associated with the social security number 555-555555. The windows 502, 508 also may display information regarding when the information was requested or provided.

In some embodiments, the same information from different information sources may be provided in different formats or in different orders. For example, a first information source might provide information regarding an applicant as follows: NAME, ADDRESS, EMPLOYER NAME, AGE, SOCIAL SECURITY NUMBER, GENDER, and DATE OF BIRTH while a second information source might provide the same applicant information as SOCIAL SECURITY NUMBER, NAME, AGE, DATE OF BIRTH, GENDER, ADDRESS, and EMPLOYER NAME. In addition, the layout, font, syntax and formats of the information may be different. The interface 500 may take information regarding the same applicant and provide or present it in the arrangement illustrated in the window 502, regardless of how or where the information is received. Thus, a user of the interface may be provided with a consistent orientation and look and feel of the information, thereby potentially increasing the user's efficiency in using the information and/or processing an application for credit. If an information source does not have information regarding a particular item, the interface 500 also may indicate this(e.g., there is no listing for date of birth in the window 502).

In some embodiments, the window 506 may include information gleaned from the three other windows 502, 504, 506 and may be used to point out any discrepancies between the information provided from the application in the window 504 and information from credit bureaus or other information sources in the windows 502, 508. The window 506, or some other part of the interface 500, also may be used to correct information provided by the applicant and/or received from an information source (e.g., a typographical mistake in address or telephone number). Corrections to information received from an information source may be provided to the information source for use in updating or maintaining its records.

In some embodiments, the window 506, and/or other portions or windows in the interface 500, may include one or more selectable buttons or links such as, for example, selectable buttons 520, 522, 524, 526, 528, 530 and 532. Selecting or clicking on different buttons may return different information or query different information sources for information. For example, selecting the button 520 labeled "CB 1" may request information regarding the applicant identified in the window 504 from a designated credit bureau. Selecting the button 530 labeled "IS 1" may request information regarding the applicant identified in the window 504 from a designated information source.

Selecting the button 526 labeled "AUD" may initiate an audit or information retrieval to see if other applications for credit have been submitted by the same applicant as listed in the window 504, from a person at the same address as listed in the window 504, etc. Audit information may be displayed in one of the windows 502, 508 or in a new window altogether. In some embodiments an audit of an application may determine if any information provided in the application has been used in other applications or may determine if an applicant has submitted previous applications using some or all of the information during a given time period. Thus, the audit may detect patterns of systemic or repetitive use of application information or data.

A high rate or velocity of submissions of credit applications by an applicant may be an indication of fraud, particularly if one or more of the previously filed credit applications is considered fraudulent or suspicious. One or more rules may be invoked to deal with or evaluate more thoroughly applications coming from the same applicant, applications using the same address, etc. or applications associated with an applicant, address, etc. having a high velocity rate or exceeding a designated velocity threshold.

The interface 500 may provide different or new buttons as different or new information sources change or become available, different or new features of the interface are implemented, different or new rules are implemented, etc.

Selecting the button 528 labeled "CB 1" may request an initial fraud risk score regarding the applicant identified in the window 504 from a designated credit bureau. The initial fraud risk score may be obtained as part of the step 352 (see FIG. 5) and displayed in a box 536 in the window 506 or somewhere else in the window 506 or the interface 500. As previously discussed above, in some embodiments, a fraud risk score or other information may be obtained automatically for an application processed by the true name fraud processor 102.

As discussed above, selecting one or more of the buttons 520, 522, 524, 526, 528, 530 or 532 may initiate an information request or query being sent to one or more information sources. The interface 500 may format or send a request differently for different information sources. The information used in the request may be taken from the information provided in the application or displayed in the window 504. Thus, in some embodiments, the methods disclosed herein may include the interface 500 formatting or tailoring a request for information to a specific information source, identifying or otherwise determining a format used by a specific information source for requests for information, etc. Such actions undertaken by the interface 500 or the true name fraud processor 102 may reduce or even eliminate a user of the interface 500 being involved in formatting, generating or sending the request after the user activates one of the buttons 520, 522, 524, 526, 528, 530 or 532. The user may not be aware of or need to be familiar with the different formats. In some embodiments, information regarding formats sending requests or queries for different information sources or for receiving information from different information sources may be found or stored in an information source database.

In some embodiments, different buttons may be active or selectable at different times. For example, if the initial fraud risk score for an application has already been returned or obtained, the button 528 may not be selectable. Making the button non selectable may prevent a user of the interface from sending another request for the initial fraud risk score once the initial fraud risk score has been obtained, thereby avoiding the cost and time of obtaining the initial fraud risk score again. As another example, if an application can be approved automatically if the initial fraud risk score is forty or fifty, or disapproved automatically if the initial fraud risk score is ten or twenty, the buttons 520, 522, 524, 526, 528, 530 and 532 all may become deactivated, unusable or unselectable since no further information regarding the applicant is necessary to approve or disapprove the application and the additional cost and time of obtaining further information regarding the applicant can be avoided. As another example, rules may require that additional information from an information source should be obtained during a step 360. If the additional information is to be obtained from the information source designated as "IS 1", the button 530 may become active, light up, or otherwise become selectable by a user of the interface 500. The user may then click on the button 530 to initial retrieval of the information.

As illustrated by these examples, the operation and usable features of the interface 500 may change in accordance with the rules used to process an application so as to minimize the time and expense involved in approving or disapproving an application, to help direct a user of the interface in reviewing a credit application, etc. In addition, in some embodiments, the interface 500 may provide different features to different users or allow different users to select different buttons or retrieve information from different sources. For example, the true name fraud processor 102 may want to distinguish between users based on skill level, the types of applications (e.g., consumer credit application or commercial credit application) the users are reviewing via the interface, the job level (e.g., manager) of the user, etc. Thus, the interface 500 may provide different privileges to different users and different privileges may allow different users to access different information sources, different buttons on the interface, etc. In some embodiments, the interface 500 may be configured to the skills and allowed privileges of a user. For example, a new user may not be allowed to retrieve information from certain information sources as part of reviewing an application. Instead, if the new user feels that information from the information source is needed, the new user may need to forward the application on to a more skilled user or obtain permission from the more skilled user to obtain the information. Such a rule may be used to protect the privacy of the applicant and/or to avoid the new user obtaining information unnecessarily (which may have a cost associated with it) as part of reviewing an application. The interface 500 may invoke such rules for the user and the true name fraud processor 102 may include or establish rules governing when a user can use or access certain features or privileges of the interface 500. In some embodiments, the apparatus and methods of the present invention may include determining or setting privileges for use of the interface 500 or determining or setting privileges for one or more specific users of the interface 500.

In some embodiments, the window 506 may include selectable buttons 538, 540 which allow a user of the interface 500 to decline or approve an application. The user may be prompted to select one of the buttons 538, 540 depending on applicable rules and information obtained regarding the application. For example, if the underlying rules indicate that an application should be declined, the decline button 538 and/or the hold button 544 may become selectable while the approve button 540 may become unselectable or unusable. If an application is declined, the user of the interface 500 may enter, or be prompted to enter, a decline code into a box 542 that indicates why an application has been rejected. The decline code may be used to generate a letter or other communication to the applicant or merchant regarding why the application was rejected. The letter or other communication may be generated automatically using the contact information provided by the applicant, the information displayed by the interface 500, etc.

In some embodiments, the window 506 may include a "HOLD" button 544 that a user of the interface 500 may select when approval or disapproval of an application cannot be determined or some other action is required. For example, an application might be placed on hold pending a telephone call to the applicant to verify information, pending receipt from an applicant of collaborating information (e.g., a bill showing a name and a house address for the applicant that matches the information listed in the window 504).

In some embodiments, the interface 500 may be used to highlight discrepancies between information provided in an application (as reflected in the window 504) and information obtained from a credit bureau or other information source. As illustrated in FIG. 7, all of the information retrieved from credit bureaus or other information sources and displayed in windows 502, 504 matches the information provided in the application as represented in the window 504. However, since the initial fraud risk score for the application was fifty, as indicated in the box 536, the information displayed in the windows 502, 508 may not have been retrieved.

In some embodiments, the interface 500 may allow new windows to be created, commands or queries to be entered, functions or features to be called, applications for review to be displayed, the status of previously or currently reviewed applications to be displayed, etc. In some embodiments, each call or request to a new information source may open up a new window for display of information from the information source. Different windows directed to different information sources may include functions, buttons, or other selectable features unique to the window or the information source.

Now referring to FIG. 8, the window 556 provides information from the application and applicant (e.g., "WILLIAM BLAKE") and indicates that mismatches occur between the residence and telephone number provided in the application and the address and telephone number returned or received from the information source designated as "INFORMATION SOURCE 1" and provided in the window 552. As indicated by the underlined portions in the window 553 and 554 and the "MISMATCH" designations in the window 556, a residence telephone number mismatch and a residence address mismatch has occurred between the information supplied in the application and the information in the window 552 returned from the information source designated as "INFORMATION SOURCE 1".

The "MISMATCH" designations in the window 556 help a user of the interface 500 focus quickly on the areas of the mismatch and may even display the mismatched information (e.g., the residence telephone number 777-777-7777 provided in the application and the residence telephone number 777-777-7778 retrieved from INFORMATION SOURCE 1) to help direct or guide the user of the interface 500 to the mismatches more quickly. One or more rules underlying the application review process may control what happens when a mismatch occurs (e.g., automatically reject the application, attempt to determine if the mismatch is merely a typographical error or the likely result of a fraudulent application) or direct the user of the interface 500 to conduct one or more specific actions (e.g., instruct or suggest that the user obtain information from another information source, contact the applicant directly to verify information or request confirming information, or request additional assistance from another party).

As illustrated in FIGS. 7 and 8, windows, portions of records obtained from credit bureaus or other information sources, pieces or portions of information, buttons, etc. may blink or flash, be highlighted, become active or inactive, etc. depending on operation of one or more rules regarding an application review process. In some embodiments, a review of an application, a determination of when to obtain information and from what source, and/or a determination regarding approval or rejection of a credit application may be entirely automated. In other embodiments, the interface 500 allows a human operator to be involved in some or all of the review process, information gathering process, and/or the application or denial decision. In some embodiments, the true name fraud processor 102 may make a determination regarding a credit application in semi-automated or completely automated manner and request a user of the interface 500 to select the decline button 538, the approve button 540, or the hold button 544 to indicate agreement or lack of agreement with the true name fraud processor's decision regarding the credit application. Thus, the interface 500 may allow a user to override the rules used by the true name fraud processor 102 if other circumstances apply or if for some reason the user disagrees with the assessment made by the true name fraud processor 102.

In some embodiments, the true name fraud processor 102 or the interface 500 may access a database that store information regarding one or more rules. The rules may be directed to when information is to be retrieved from an information source or other device or entity and/or how an evaluation of an application is to proceed in light of information obtained.

Databases

As previously discussed above, in some embodiments a device (e.g., the application processor 110, the true name fraud processor 102) may include, use or access an applicant or application information database for storing or keeping information regarding one or more applicants or applications. One representative applicant information database 600 is illustrated in FIG. 9.

The applicant information database 600 may include an applicant information field 602 that may include codes or other identifiers for one or more applicants for credit, a name field 604 that may include names or other descriptive information for the applicants identified in the field 602, an address field 606 that may include address or other contact information for the applicant's identified in the field 602, a social security number field 608 that may include social security numbers for the applicants identified in the field 602, and a telephone number field 610 that may include telephone information regarding the applicants identified in the field 602.

In some embodiments, other or different fields also may be used in the applicant information database 600. For example, in some embodiments a field identifying applications associated with the applicants identified in the field 602, information identifying the sources of the information in the database 600, information pulled from an application (e.g., gender, employer, date of birth, previous address, business telephone number, email address) or received from a credit bureau or other information source (e.g., account number, account balance, credit history, joint account information), etc. The database may be used to generate audit histories, to allow the true name processor 102 to avoid multiple times paying for information from a credit bureau or other information source, or to speed up the application review process. In addition, information in the database may be used in or as part of a request to an information source for additional information. For example, the true name fraud processor 102 may send a request to an information source as part of the step 360 or when a user selects the button "CB 1" on the interface 500. When sending or formulating the request, the true name fraud processor 102 can pull information from the database and avoid manual entry of the information, thereby avoiding errors that might occur from the manual entry and reducing the time needed to formulate and send the request for information.

In some embodiments, the true name fraud processor 102 may compare information in the database to look for repeated patterns or other trends indicating the presence of fraud (e.g., the use of the same or similar social security numbers or business addresses in multiple applications).

In some embodiments, the true name fraud processor 102 may also track the performance and or actions of users of the interface 500 or other people involved in the evaluation of one or more applications. For example, the true name fraud processor 102 may track or monitor the applications declined and approved by a specific user of the interface and analyze any results to determine if the user is incorrectly approving applications that should be rejected and/or incorrectly rejecting applications that should be approved. Such a pattern may indicate that the user is not trained properly or perhaps is committing fraud or mistakes (intentionally or unintentionally) as part of the application review process conducted by the user.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CDROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The invention claimed is:

1. A computer implemented method for facilitating evaluation of a credit application for fraud, comprising:

storing, in a computer, a first plurality of rules governing when different portions of information are to be obtained for use in true name fraud evaluation;

storing, in said computer, a second plurality of rules governing how an application is to be evaluated in view of information obtained in accordance with said first plurality of rules;

receiving data indicative of a first application requiring true name fraud evaluation;

obtaining information associated with said first application in accordance with said first plurality of rules from a first source;

obtaining, from at least one second source different than said first source, additional information associated with said first application in accordance with said first plurality of rules and in response to said received data; and evaluating, for true name fraud, said first application in accordance with said second plurality of rules; and displaying at least a portion of said information from each of said first source and said at least one second source, each in a distinct window of an interface screen.

2. The method of claim 1, wherein each of said different portions of information has an associated cost.

3. The method of claim 2, wherein storing said first plurality of rules includes establishing rules that minimize a cost associated with evaluating said application in accordance with said second plurality of rules.

4. The method of claim 2, wherein said first plurality of rules includes rules that reduce a chance of information being obtained unnecessarily for an application being reviewed.

5. The method of claim 2, wherein a cost of a portion of information is incurred when said portion of information is obtained.

6. The method of claim 1, wherein said first plurality of rules includes at least one rule regarding when information regarding an application can be obtained from a designated information source.

7. The method of claim 1, wherein said first plurality of rules includes at least one rule regarding when information regarding an application can be obtained by a designated user.

8. The method of claim 1, wherein said second plurality of rules includes at least one rule regarding when an application can be approved by a designated user.

9. The method of claim 1, wherein said second plurality of rules includes at least one rule regarding when an application must be declined.

10. The method of claim 1, wherein said second plurality of rules includes at least one rule regarding when an application may be approved without further retrieval of information.

11. The method of claim 1, further comprising storing data indicative of said first plurality of rules in a database.

12. The method of claim 1, further comprising storing data indicative of said second plurality of rules in a database.

13. The method of claim 1, wherein said first application is for a credit card.

14. A computer program in a computer readable medium for facilitating evaluation of an application for credit, said computer readable medium executed on a computer, said computer program comprising:
   instructions for obtaining data indicative of an application requiring true name fraud evaluation;
   instructions for identifying at least one first rule regarding obtaining of information associated with said application;
   instructions for identifying at least one second rule regarding evaluation of said application using said information;
   instructions for obtaining information regarding said application in accordance with said at least one first rule from a first source;
   instructions for obtaining, from at least a second source different than said first source, additional information associated with said first application in accordance with said first plurality of rules and in response to said received data;
   instructions for evaluating, for true name fraud, said application in accordance with said at least one second rule; and
   instructions for displaying at least a portion of said information from each of said first source and said at lest one second source, each in a distinct window of an interface screen.

15. A system for facilitating evaluation of an application for credit, comprising:
   a memory;
   a communication port; and
   a processor connected to said memory and said communication port, said processor being operative to:
      receive data indicative of an application requiring a true name fraud evaluation;
      determine at least one first rule regarding obtaining of information associated with said application;
      determine at least one second rule regarding evaluation of said application using said information;
      obtain information regarding said application in accordance with said at least one first rule from a first source;
      obtain, from at least a second source different than said first source, additional information associated with said first application in accordance with said first plurality of rules and in response to said received data;
      make a determination regarding approval of said application in accordance with said at least one second rule; and
      display at least a portion of said information from each of said first source and said at lest one second source, each in a distinct window of an interface screen.

16. The system of claim 15, wherein said processor is operative to display at least a portion of said information via an interface.

* * * * *